United States Patent [19]

Burns

[11] 4,231,690
[45] Nov. 4, 1980

[54] TUBE LOCK DRILL TOOL

[75] Inventor: David C. Burns, Trafford, Pa.

[73] Assignee: Westinghouse Electric Corp., Pittsburgh, Pa.

[21] Appl. No.: 898,347

[22] Filed: Apr. 21, 1978

[51] Int. Cl.² .......................... B23B 41/00; B23B 41/10
[52] U.S. Cl. ...................................... 408/80; 408/100; 408/111; 82/4 C
[58] Field of Search ................. 82/4 C; 408/72 R, 80, 408/99, 100, 111; 90/12 R

[56]  References Cited
U.S. PATENT DOCUMENTS

| 2,289,631 | 7/1942 | Cuda et al. | 408/80 |
| 3,913,752 | 10/1975 | Ward et al. | 214/1 BB |
| 4,018,346 | 4/1977 | Leshem et al. | 214/1 BB |

FOREIGN PATENT DOCUMENTS

239037  9/1925  United Kingdom ..................... 408/111

Primary Examiner—Leonidas Vlachos
Attorney, Agent, or Firm—L. A. DePaul; Z. L. Dermer

[57]  ABSTRACT

A tube lock drill for remotely performing operations on equipment including a positioning mechanism disposed in the equipment for selectively positioning the tool with respect to the equipment with the tool comprising a locking mechanism associated with the positioning mechanism for securing the tool in proper relationship to the equipment, a cutting mechanism disposed on a locking mechanism for performing cutting operations on the equipment, and a lifting mechanism attached to the positioning mechanism and attached to the cutting mechanism for lifting the cutting mechanism into contact with the equipment. The tube lock drill tool is capable of being arranged in a plenum of a nuclear steam generator so that remote operations may be performed on the tube sheet and heat exchange tubes in the nuclear steam generator.

7 Claims, 6 Drawing Figures

TUBE LOCK DRILL TOOL

CROSS-REFERENCE TO RELATED APPLICATIONS

The invention described herein is related to copending applications Ser. No. 888,701, filed Mar. 21, 1978, entitled "Apparatus For Remotely Repairing Tubes In A Steam Generator" by L. R. Golick, and Ser. No. 895,831, filed Apr. 13, 1970, entitled "Improved Apparatus For Remotely Repairing Tubes In A Steam Generator" by F. W. Cooper, both of which are assigned to the assignee of the present application.

BACKGROUND OF THE INVENTION

This invention relates to nuclear steam generators and more particularly to apparatus for remotely repairing the tubes and tube sheet in a nuclear steam generator.

There are many situations in which a hazardous environment limits human access to various locations. One such situation occurs in the inspection and repair of nuclear steam generators which have been operating. A typical nuclear steam generator comprises a vertically oriented shell, a plurality of U-shaped tubes disposed in the shell so as to form a tube bundle, a tube sheet for supporting the tubes at the ends opposite the U-like curvature, and a dividing plate that cooperates with the tube sheet forming a primary fluid inlet plenum at one end of the tube bundle and a primary fluid outlet plenum at the other end of the tube bundle. The primary fluid having been heated by circulation through the nuclear reactor core enters the steam generator through the primary fluid inlet plenum. From the primary fluid inlet plenum, primary fluid flows upwardly through first openings in the U-tubes near the tube sheet which supports the tubes, through the U-tube curvature, downwardly through second openings in the U-tubes near the tube sheet, and into the primary fluid outlet plenum. At the same time, a secondary fluid, known as feedwater, is circulated around the U-tubes in heat transfer relationship therewith thereby transferring heat from the primary fluid in the tubes to the secondary fluid surrounding the tubes causing a portion of the secondary fluid to be converted to steam. Since the primary fluid contains radioactive particles and is isolated from the secondary fluid by the U-tube walls and the tube sheet, it is important that the U-tubes and the tube sheet be maintained defect-free so that no breaks will occur in the U-tubes or in the welds between the U-tubes and the tube sheet thus preventing contamination of the secondary fluid by the primary fluid.

Occasionally it is necessary to either inspect or repair the U-tubes or tube sheet welds by way of access through the primary fluid inlet and outlet plena. For this purpose manways are provided in the vertical shell so that working personnel may enter the inlet and outlet plena to perform operations on the U-tubes and tube sheet. However, since the primary fluid which is generally water contains radioactive particles, the inlet and outlet plena become radioactive which thereby limits the time that working personnel may be present therein. Accordingly, it would be advantageous to be able to perform operation on the U-tubes and tube sheet without requiring the presence of working personnel. There are several mechanisms known in the art that attempt to provide a solution to this problem, but none of them have been able to completely solve the problem.

In copending application Ser. No. 888,701, filed Mar. 21, 1978, and entitled "Apparatus For Remotely Repairing Tubes In A Steam Generator" by L. R. Golick and assigned to the assignee of the present application, there is described a positioning mechanism for remotely positioning repair tools with respect to the U-tubes and tube sheet of a nuclear steam generator. The apparatus comprises a column rotatably disposed in either the inlet or outlet plenum of a nuclear steam generator with the column having one end terminating a predetermined distance from the tube sheet while being fastened to the divider plate and with the bottom end of the column resting in a spherical bearing block. The apparatus also comprises a boom pivotally mounted near the top end of the column with a carriage disposed on the boom and capable of moving along the boom for positioning a tool that is mounted on the carriage in relationship to the tube sheet or the U-tubes of the nuclear steam generator to thereby perform operations on the nuclear steam generator.

Copending application Ser. No. 895,831, filed Apr. 13, 1978 and entitled "Improved Apparatus For Remotely Repairing Tubes In A Steam Generator" describes an improved positioning mechanism for remotely positioning repair tools in a steam generator. The improved positioning mechanism includes a cantilevered tool holder having a chuck on the end thereof along with a drive mechanism connected to the chuck for providing power to a tool mounted in the chuck.

While these copending applications do describe positioning mechanisms for positioning tools with respect to the tube sheet and U-tubes of a nuclear steam generator, what is needed is a drill that is capable of being attached to the tube sheet or U-tubes in the nuclear steam generator to thereby partially support the weight of the drill tool, resist the drilling loads imposed on the boom, and to guide the drill tool during the operations.

SUMMARY OF THE INVENTION

A tube lock drill tool for remotely performing operations on equipment including a positioning mechanism disposed in the equipment for selectively positioning a tool with respect to the equipment comprises a locking mechanism associated with the positioning mechanism for securing the tool in proper relationship to the equipment, a cutting mechanism disposed on the locking mechanism for performing cutting operations on the equipment, and a lifting mechanism disposed on the positioning mechanism and attached to the cutting mechanism for lifting the cutting mechanism into contact with the equipment. The cutting mechanism comprises a rotatable cutting bit disposed on the locking mechanism with a drive motor connected to the cutting bit by a gear train for rotating the cutting bit about the axis of the locking mechanism for cutting metal portions of the equipment and for removing welds associated with the equipment to thereby allow removal of the previously welded members. The locking mechanism comprises a shaft with an expandable sleeve mounted thereon that is capable of being inserted into a tube of the steam generator for contacting the inside of the tube of the steam generator to thereby partially support the weight of the tube lock drill tool and to provide guidance for the cutting mechanism. The tube lock drill tool provides apparatus that is capable of being inserted into a tube of a nuclear steam generator and attached thereto for supporting part of its own weight while providing guidance for a cutting mechanism for cutting the weld between the tube and the tube sheet.

BRIEF DESCRIPTION OF THE DRAWINGS

While the specification concludes with claims particularly pointing out and distinctly claiming the subject matter of the invention, it is believed the invention will be better understood from the following description taken in conjunction with the accompanying drawings, wherein:

DESCRIPTION OF THE PREFERRED EMBODIMENT

In a tube-type steam generator, a tube sheet supports a bundle of heat transfer tubes. The invention described herein provides a tube lock drill tool for performing operations on equipment located in areas where human access is limited such as near a tube sheet of a nuclear steam generator.

Figure 1:
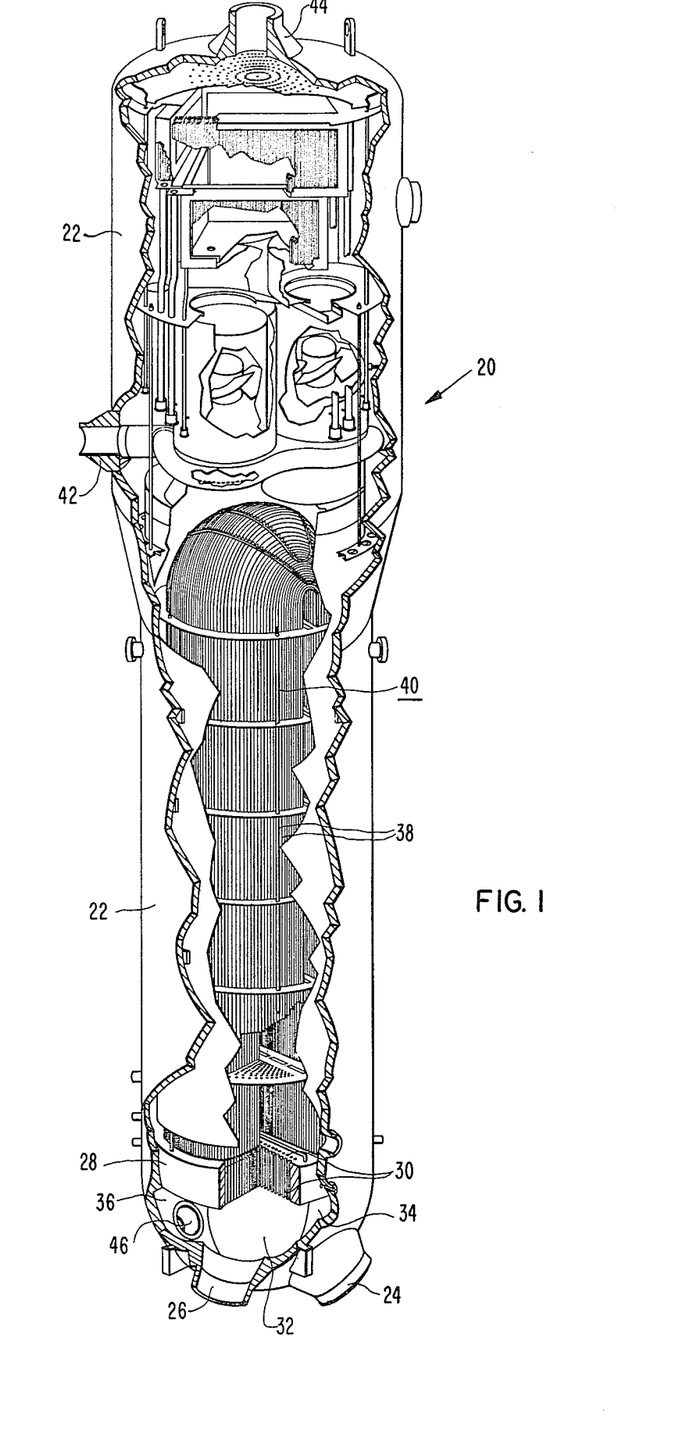
FIG. 1 is a partial cross-sectional view in elevation of a typical steam generator.

Referring to FIG. 1, a nuclear steam generator referred to generally as 20, comprises an outer shell 22 with a primary fluid inlet nozzle 24 and a primary fluid outlet nozzle 26 attached thereto near its lower end. A generally cylindrical tube sheet 28 having tube holes 30 therein is also attached to outer shell 22 near its lower end. A dividing plate 32 attached to both tube sheet 28 and outer shell 22 defines a primary fluid inlet plenum 34 and a primary fluid outlet plenum 36 in a lower end of the steam generator as is well understood in the art. Tubes 38 which are heat transfer tubes shaped with a U-like curvature are disposed within outer shell 22 and attached to tube sheet 28 by means of tube holes 30. Tubes 38 which may number about 7,000 form a tube bundle 40. In addition, a secondary fluid inlet nozzle 42 is disposed on outer shell 22 for providing a secondary fluid such as water while a steam outlet nozzle 44 is attached to the top of outer shell 22. In operation, the primary fluid which may be water having been heated by circulation through the nuclear reactor core enters steam generator 20 through primary fluid inlet nozzle 24 and flows into primary fluid inlet plenum 34. From primary fluid inlet plenum 34 the primary fluid flows upwardly through the tubes 38, and tube sheet 28, up through the U-shaped curvature of tubes 38, down through tubes 38 and into primary fluid outlet plenum 36 where the primary fluid exits the steam generator through primary fluid outlet nozzle 26. While flowing through tubes 38, heat is transferred from the primary fluid to the secondary fluid which surrounds tubes 38 causing the secondary fluid to vaporize. The resulting steam then exits the steam generator through steam outlet nozzle 44. On occasion, it is necessary to inspect or repair tubes 38 or the welds between tubes 38 and the tube sheet 28 to assure that the primary fluid which may contain radioactive particles remains isolated from the secondary fluid. Therefore, manways 46 are provided in outer shell 22 to provide access to both primary fluid inlet plenum 34 and primary fluid outlet plenum 36 so that access may be had to the entire tube sheet 28.

Figure 2:
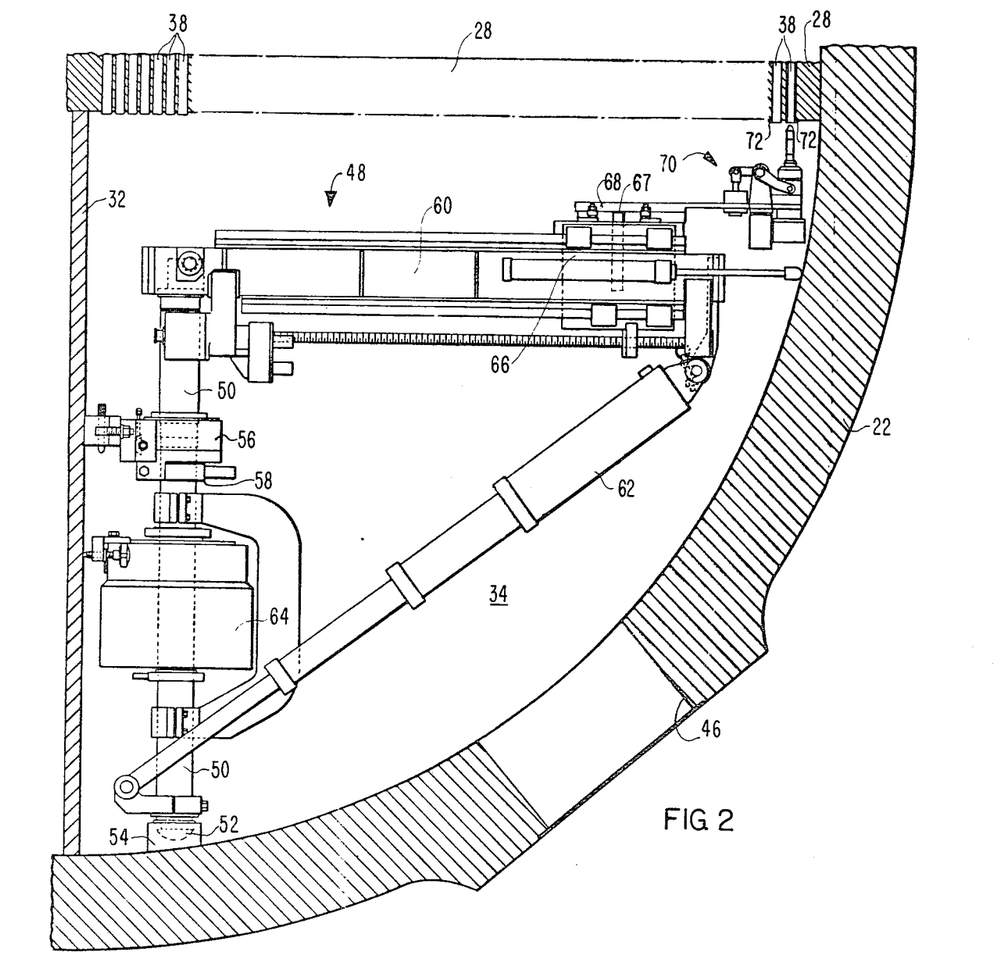
FIG. 2 is a cross-sectional view in elevation of the positioning mechanism disposed in a plenum of the nuclear steam generator with the drill tool mounted thereon.

Referring now to FIG. 2, a positioning mechanism referred to generally as 48 comprises a vertically oriented column 50 which is pivotally connected to the bottom of inlet plenum 34 and extends generally upwardly therefrom. The column 50 is generally perpendicular to tube sheet 28 and disposed adjacent to dividing plate 32. A spherical bearing block, which contains tapered roller bearing 52 is disposed at the foot of column 50 in a spherical housing, which is fastened to the bottom of inlet plenum 34 by welding or other means and forms a first support mechanism 54 for column 50. A second support mechanism 56 is attached to dividing plate 32 by welding or other means and is disposed adjacent the intermediate portion of column 50. Column 50 is rotatably disposed within second support mechanism 56 by an anti-friction bearing such as ball or roller bearings (not shown). The second support mechanism 56 also has a split collar 58 disposed thereon for locking column 50 in any of its rotated positions. A boom 60 is pivotally connected to the upper end of column 50 by a suitable mounting bracket. The pivotal connection is such that boom 60 rotates with column 50 and can pivot from a position generally parallel to tube sheet 28 to a position generally aligned with the manway 46. A pair of telescoping hydraulic cylinders 62 (only one is shown) are pivotally connected to the lower end of column 50 by a suitable bracket and to the distal end of boom 60 by another bracket to provide means for pivoting boom 60 from a position generally parallel to tube sheet 28 to a position generally aligned with manway 46. A hollow shaft DC motor 64 is disposed around column 50 and connected thereto for rotating column 50 and boom 60 about the vertical axis of column 50. A carriage 66 is slidably disposed on boom 60 so that carriage 66 moves rectilinearly and parallel to the longitudinal axis of boom 60. Carriage 66 may also have a vertical drive mechanism 67 incorporated therein and attached to a platform 68 for raising platform 68 toward tube sheet 28. Vertical drive mechanism 67 may be a hydraulic cylinder chosen from those well known in the art. A drill tool referred to generally as 70 is mounted on platform 68 of carriage 66 for performing drilling operations on tube sheet 28, tubes 38, and welds 72 which join tube sheet 28 and tubes 38 near the bottom ends of tubes 38. Positioning mechanism 48 provides a means by which drill tool 70 may be positioned in alignment with and near a particular tube 38 of tube sheet 28 so that drilling operations may be performed on that particular tube and associated welds 72.

Figure 3:
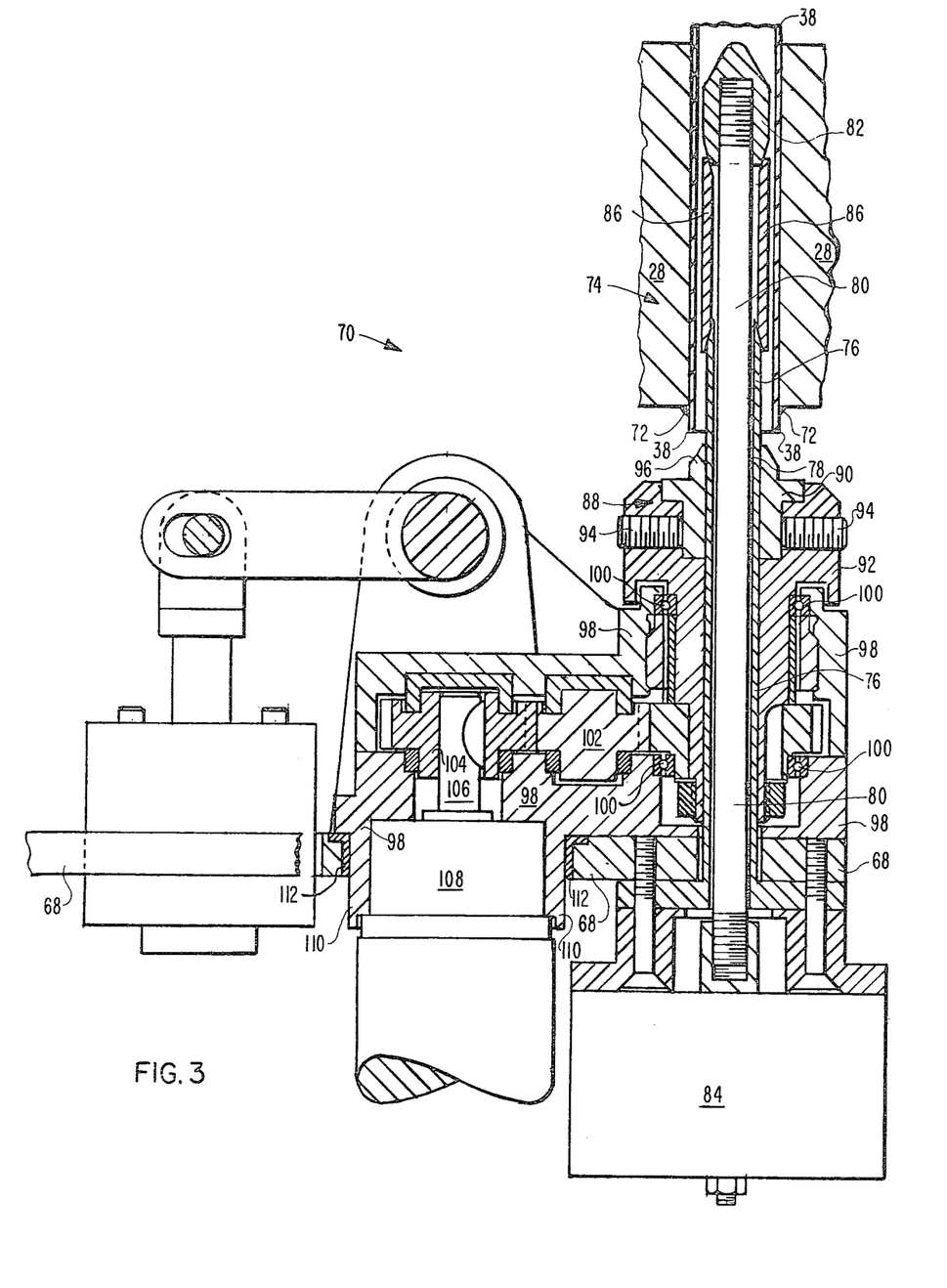
FIG. 3 is a partial cross-sectional view in elevation of the tube lock drill tool with the locking mechanism inserted into a tube of the nuclear steam generator and in an unlocked position.

Referring now to FIG. 3, drill tool 70 comprises a locking mechanism referred to generally as 74 which comprises a first shaft 76 attached at its lower end to platform 68 and having a bore 78 therein and a second shaft 80 extending through bore 78 and having a cap 82 attached to the top end thereof. A first actuator 84 which may be an air or hydraulic cylinder chosen from those well known in the art is attached to the bottom end of second shaft 80 and to platform 68 for selectively moving second shaft 80 relative to first shaft 76. An expandable sleeve 86 is disposed on second shaft 80 between cap 82 and first shaft 76. When second shaft 80 is moved downwardly relative to first shaft 76 by first actuator 84, cap 82 contacts the upper end of sleeve 86 and forces sleeve 86 downwardly onto first shaft 76 thereby expanding sleeve 86 into contact with the inside surface of tube 38. When sleeve 86 has thus been expanded into contact with the inside surface of tube 38, locking mechanism 74 is capable of supporting the weight of drill tool 70. Due to the resiliency of sleeve 86, movement of second shaft 80 upwardly relative to first shaft 76 by first actuator 84 causes sleeve 86 to become disengaged from the inside surface of tube 38 thereby unlocking locking mechanism 74.

Still referring to FIG. 3, drill tool 70 also comprises a cutting mechanism 88 which comprises a rotatable cutting bit 90 which is rotatably disposed around first shaft 76 and mounted on first mounting 92 by means of set screws 94. Cutting bit 90 has a cutting surface 96 chosen so as to conform to a predetermined weld preparation angle. First mounting 92 is rotatably disposed on second mounting 98 by means of bearings 100. Second mounting 98 is capable of resting on platform 68 but is not firmly attached thereto so as to be able to be moved relative to platform 68. A first gear 102 disposed in second mounting 98 is attached at one side to first mounting 92 and at the other side to second gear 104. Second gear 104 is also mounted in second mounting 98 and attached by axle 106 to drive mechanism 108. Drive mechanism 108 which may be a 35 foot-pound air-operated motor chosen from those well known in the art serves to drive axle 106, second gear 104, first gear 102 and first mounting 92 so as to rotate cutting bit 90 about the vertical axis of first shaft 76. Second mounting 98 has an extension 110 that extends along drive mechanism 108 and is slidable disposed within bushing 112 which is firmly attached to platform 68 so that second mounting 98 and drive mechanism 108 may be moved vertically relative to bushing 112.

Figure 4:
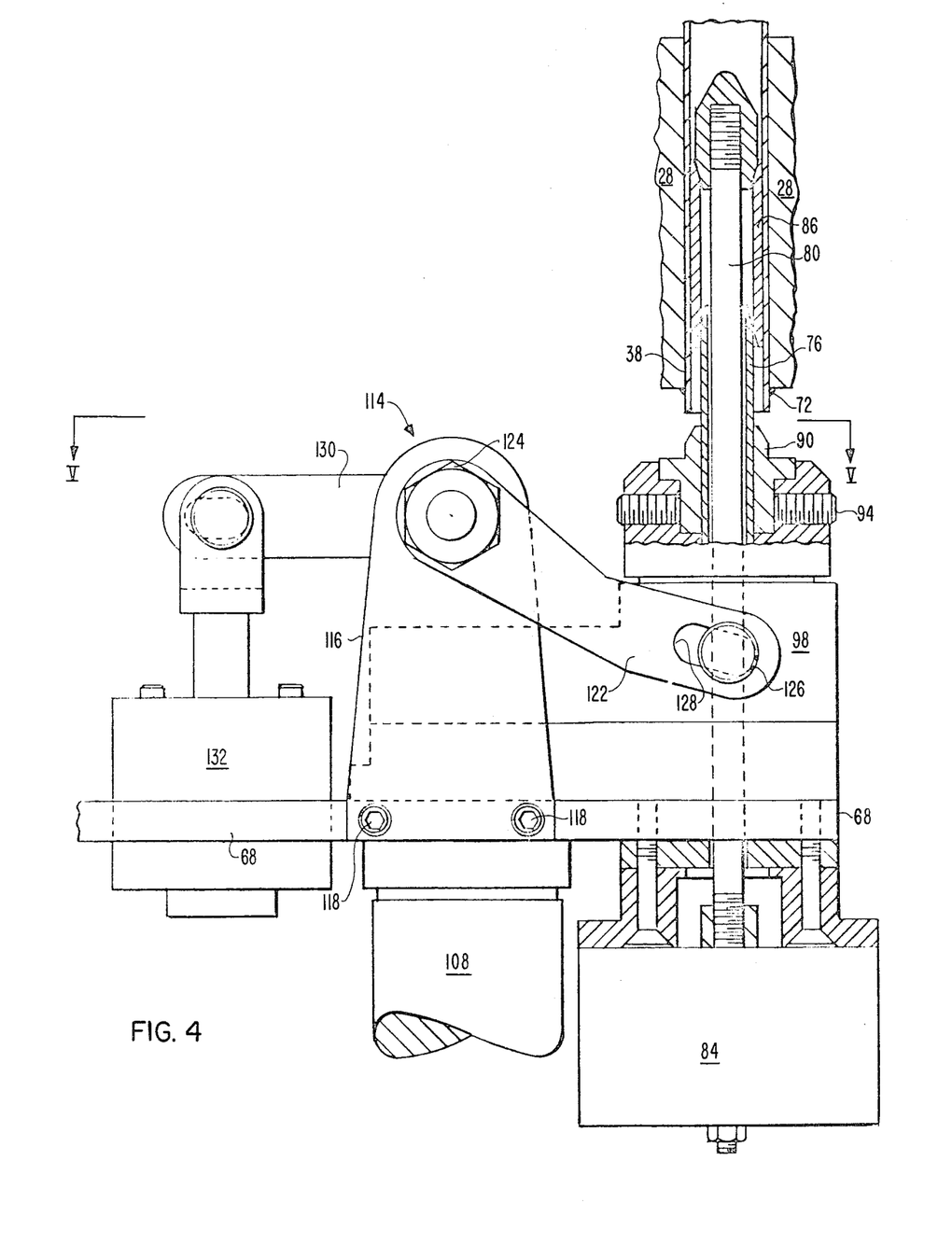
FIG. 4 is a partial cross-sectional view in elevation of the tube lock drill tool in the locked position.
Figure 5:
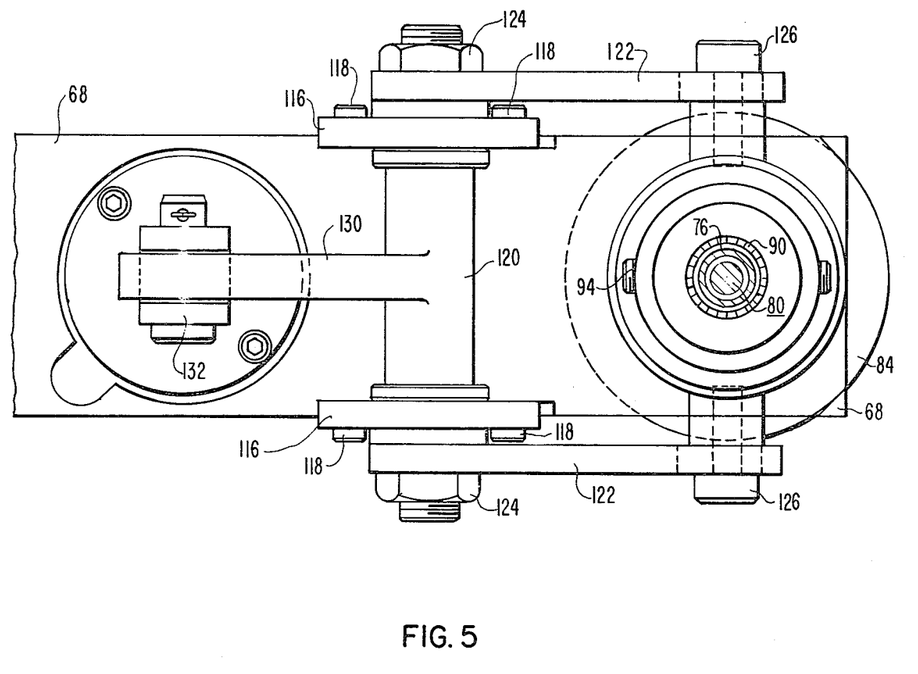
FIG. 5 is a view along the line V—V of FIG. 4.
Figure 6:
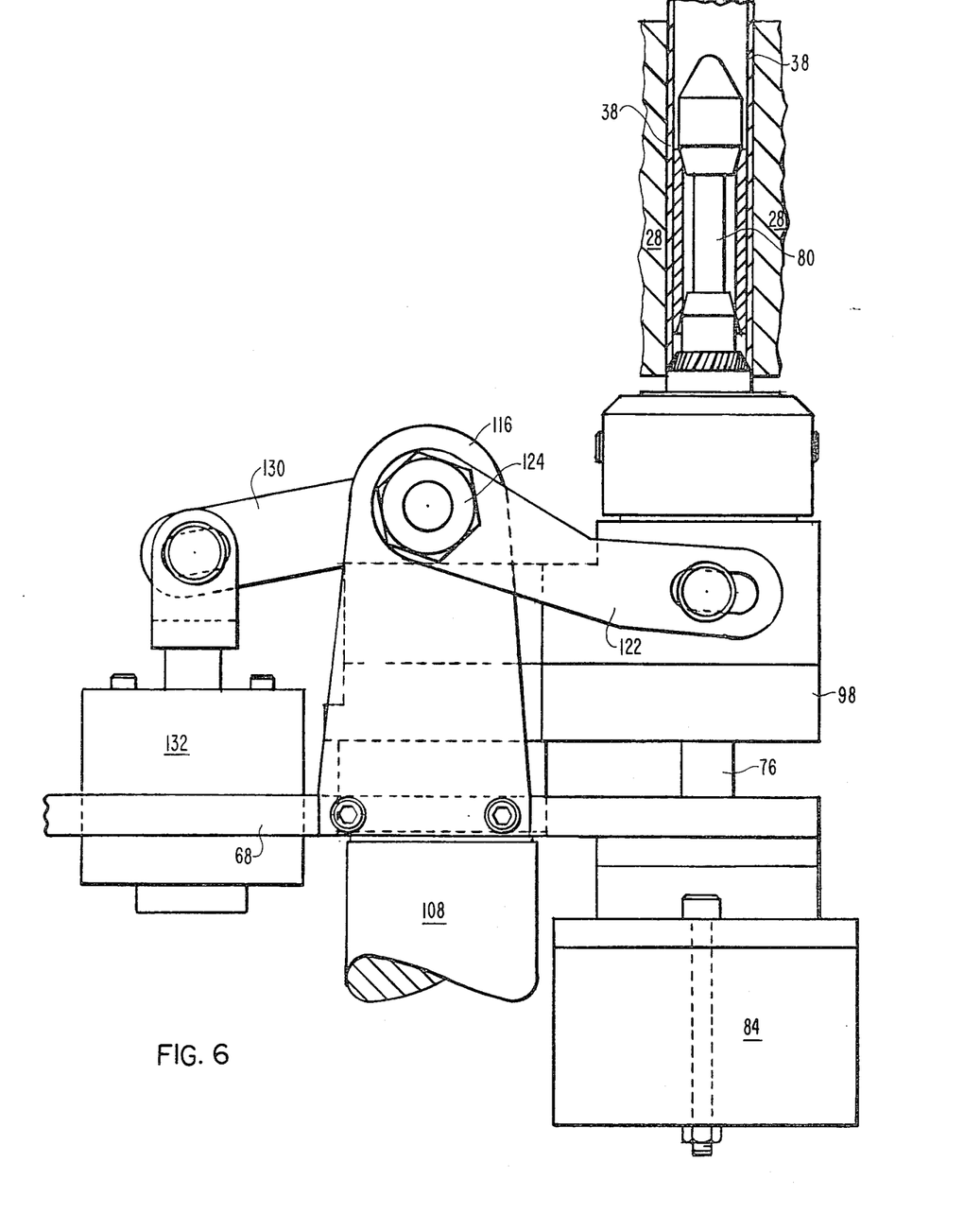
FIG. 6 is a partial cross-sectional view in elevation of a tube lock drill tool in the locked and raised position.

Referring now to FIGS. 4 and 5, lifting mechanism 114 comprises two vertical supports 116 which are attached to platform 68 by means of bolts 118. A horizontal rod 120 is rotatably disposed through both vertical supports 116 near the top end thereof. A pair of first arms 122 are bolted to horizontal rod 120 at their first end by means of nuts 124 and connected at their other ends to pins 126 which are connected to second mounting 98 and are disposed in slot 128 of first arms 122. Slots 128 allow pins 126 to slide therealong as first arms 122 are pivoted upwardly. A connecting rod 130 is attached at one end to horizontal rod 120 and at the other end to a second actuator 132. Second actuator 132 may be an air or cylinder cylinder arrangement chosen from those well known in the art and is attached firmly to platform 68. When second actuator 132 is actuated, connecting rod 130 is rotated downwardly toward platform 68 which causes horizontal rod 120 to be rotated in a counterclockwise rotation as shown in FIG. 4. The rotation of horizontal rod 120 causes first arms 122 to also be rotated in a counterclockwise rotation which causes pins 126 and second mounting 98 to be lifted toward tube sheet 28 as shown in FIG. 6 In this manner, cutting bit 90 may be brought into contact with tube 38, welds 72, and tube sheet 28 to thereby allow cutting bit 90 to perform cutting operations on those parts.

OPERATION

When it is desired to perform operations on tube sheet 28, tubes 38, or welds 72, positioning mechanism 48 is installed in either inlet plenum 34 or outlet plenum 36 as shown in FIG. 2. Positioning mechanism 48 then remotely positions drill tool 70 in colinear alignment with the chosen tube 38 and near the bottom of the chosen tube 38. At this point the vertical drive mechanism of carriage 66 is activated which causes platform 68 to be moved toward tube sheet 28 which in turn causes locking mechanism 74 to be inserted into the chosen tube 38 as shown in FIG. 3. At this point, first actuator 84 is activated which causes second shaft 80 to be drawn downwardly with respect to first shaft 76 which causes sleeve 86 to be expanded outwardly into contact with the inside surface of tube 38 thereby locking drill tool 70 into close contact with tube 38. Once the drill tool 70 has been locked into a particular tube 38, drive mechanism 108 is activated which causes second gear 104, first gear 102, and first mounting 92 to be rotated. The rotation of first mounting 92 causes cutting bit 90 to be rotated about first shaft 76 at a speed of approximately 110 rpm. With cutting bit 90 rotating and in a position as indicated in FIG. 4, lifting mechanism 114 is activated by activating second actuator 132 which causes connecting rod 130 to be rotated in a counterclockwise direction. The rotation of connecting rod 130 causes horizontal rod 120 to be also rotated in a counterclockwise direction which causes first arms 122 to also be rotated in a counterclockwise direction. The rotation of first arms 122 causes pins 126 and second mounting 98 to be raised toward tube sheet 28. When second mounting 98 is thus raised upwardly toward tube sheet 28, extension 110 of second mounting 98 slides along bushing 112 which allows the entire second mounting 98 to be lifted upwardly with respect to platform 68. Since first shaft 76 is firmly attached to platform 68 and since cutting bit 90 rotates about first shaft 76, as second mounting 98 is thus raised upwardly first shaft 76 serves as an aligning post for cutting bit 90. Thus as second mounting 98 is moved upwardly, cutting bit 90 is guided upwardly along first shaft 76 as cutting bit 90 is being rotated. As cutting bit 90 is being advanced toward tube sheet 28, cutting surface 96 encounters the bottom end of tube 38, welds 72, and the bottom end of tube sheet 28 thereby cutting those members as contact is made as shown in FIG. 6. In this manner, the bottom end of tube 38 is removed from the remainder of tube 38 and welds 72 are also ground away. In addition, approximately 5 mils of the inner surface of tube sheet 28 surrounding a particular tube 38 is also machined away. At this point, tube 38 is no longer welded to tube sheet 28 so that the tube lock drill tool may be removed from tube 38 in a manner opposite to the manner in which it was placed therein. Once the lower end of the tube 38 has been disconnected from tube sheet 28, apparatus located above tube sheet 28 may be utilized to pull tube 38 from tube sheet 28. As an alternative, another machine may be used on positioning mechanism 48 to cut tube 38 at a location above tube sheet 28 and remove it from the tube sheet 28 by pulling tube 38 downwardly. Cutting surface 96 is chosen such that the depth and angle of the cut made on tube sheet 28 establishes a weld preparation so that when a replacement tube 38 is inserted into the position occupied by the removed tube 38 the bottom end of tube sheet 28 will have been prepared for a new weld to be applied thereto. Therefore, the invention provides a tube lock drill tool for remotely separating tubes from the tube sheet in a nuclear steam generator while preparing the tube sheet for insertion of a new tube therein.

I claim as my invention:

1. A tube lock drill tool for remotely performing operations on equipment including positioning means disposed in said equipment for selectively positioning a tool with respect to said equipment for performing operations on said equipment, said tool comprising:

locking means associated with said positioning means for securing said tool in proper relationship to said equipment;

cutting means disposed on said locking means for performing cutting operations on said equipment;

a support member attached to said positioning means;

a rotatable pin disposed within said support member;

a first arm attached at one end to said pin and at the other end to said cutting means; and     rotating means disposed on said positioning means and connected to said pin for selectively rotating said pin thereby causing said cutting means to be selectively advanced toward said equipment.

2. The tube lock drill tool according to claim 1 wherein said cutting means comprises:

a rotatable cutting bit disposed on said locking means; and     drive means connected to said cutting bit by a gear train for rotating said cutting bit about the axis of said locking means for cutting metal portions of said equipment and welds associated therewith thereby allowing removal of the previously welded members.

3. The tube lock drill tool according to claim 2 wherein said locking means comprises:

a first shaft having a bore therein and extending through said cutting bit;

a second shaft disposed in said bore and having a cap on the end thereof;

an expandable sleeve disposed on said second shaft near said cap for contacting said equipment and supporting said tool; and     first actuating means connected to said second shaft for selectively moving said second shaft relative to said first shaft thereby causing said sleeve to contact said cap and said first shaft thus expanding said sleeve into contact with said equipment.

4. The tube lock drill tool according to claim 3 wherein said positioning means comprises:

a vertical column disposed within said equipment;

a boom pivotally mounted on said column;

a carriage mounted on said boom and capable of moving along said boom for supporting said tool and for positioning said tool with respect to said equipment; and     vertical positioning means attached to said carriage and said boom for vertically positioning said carriage with respect to said equipment.

5. The tube lock drill tool according to claim 4 wherein said drive means comprises an air motor.

6. The tube lock drill tool according to claim 5 wherein said first actuating means comprises a hydraulic cylinder.

7. The tube lock drill tool according to claim 6 wherein said second actuating means comprises a hydraulic cylinder.

* * * * *